(12) United States Patent
Strandborg et al.

(10) Patent No.: US 12,513,269 B2
(45) Date of Patent: Dec. 30, 2025

(54) VIDEO TRANSPORT METHOD AND SYSTEM

(71) Applicant: Varjo Technologies Oy, Helsinki (FI)

(72) Inventors: Mikko Strandborg, Hangonkylä (FI); Ville Timonen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/641,526

(22) Filed: Apr. 22, 2024

(65) Prior Publication Data

US 2025/0330561 A1    Oct. 23, 2025

(51) Int. Cl.
*H04N 9/64* (2023.01)
*H04N 9/67* (2023.01)
*H04N 19/132* (2014.01)

(52) U.S. Cl.
CPC .............. *H04N 9/646* (2013.01); *H04N 9/67* (2013.01); *H04N 19/132* (2014.11)

(58) Field of Classification Search
CPC ......... H04N 9/646; H04N 9/67; H04N 19/132
See application file for complete search history.

(56) References Cited

U.S. PATENT DOCUMENTS

| | | | | |
|---|---|---|---|---|
| 2007/0058859 A1* | 3/2007 | Baker | ...................... | H04N 1/60 382/167 |
| 2013/0003129 A1* | 1/2013 | Mebane | ............... | H04N 1/6027 358/1.9 |
| 2016/0155245 A1* | 6/2016 | Stauder | .................. | G06T 11/001 382/167 |
| 2016/0205370 A1* | 7/2016 | Wallace | .................... | H04N 9/67 348/571 |
| 2017/0116955 A1* | 4/2017 | Stauder | ...................... | G09G 5/02 |
| 2017/0251211 A1* | 8/2017 | Froehlich | ............. | H04N 19/124 |
| 2018/0007374 A1* | 1/2018 | Atkins | .................... | H04N 19/85 |
| 2018/0130188 A1* | 5/2018 | Farrell | ...................... | G06T 7/90 |
| 2018/0233074 A1* | 8/2018 | Wu | ....................... | G09G 3/3233 |

* cited by examiner

*Primary Examiner* — Michael Lee
(74) *Attorney, Agent, or Firm* — Ziegler IP Law Group, LLC.

(57) ABSTRACT

Disclosed is a video transport method including receiving high dynamic range (HDR) video content comprising HDR images; performing HDR mastering for HDR images according to HDR mastering parameters; transforming an input colour space of each HDR image amongst HDR images into a transport colour space, and transporting HDR images having transport colour space. Herein, transforming an input colour space of HDR images into transport colour space is performed by: plotting colour component values (CCVs) of pixels in a first HDR image amongst a given set of HDR images, across a multi-dimensional colour space; identifying a bounding box corresponding to the first HDR image, wherein the bounding box encloses CCVs of two or more colour components represented in multi-dimensional colour space; determining a transformation to be applied to input colour space of the given set of HDR images; applying transformation to each HDR image in given set of HDR images.

19 Claims, 1 Drawing Sheet

VIDEO TRANSPORT METHOD AND SYSTEM

TECHNICAL FIELD

The present disclosure relates to video transport methods. The present disclosure also relates to video transport systems.

BACKGROUND

Video streaming systems have revolutionized access and consumption of video content by users. The video content could be television shows, movies, live events, extended-reality (XR) videos, and the like. Presently, the video streaming systems deliver visual or audio-visual experiences across various devices, transcending geographical boundaries and time constraints. Nowadays, requirements for visual quality are growing in video streaming systems. The video content being streamed is often High Dynamic Range (HDR) video content, which utilizes a wider range of brightness levels and colours compared to standard video content.

However, existing video streaming systems are not sufficiently well-developed to support the transport of the HDR video content. Firstly, in a two-dimensional (2D) HDR video streaming system, the HDR video content is transported using lossy encoding (such as High Efficiency Video Coding (HEVC)) and a 10-bit colour depth, wherein colour values are quantized to 1024 (i.e., 2^10) discrete steps. However, the discrete steps themselves do not carry any intrinsic meaning. Hence, additional metadata is needed to convey the HDR video content to map the discrete steps into physical luminosities, which increases consumption of processing resources. Secondly, existing video streaming systems (such as HDR10 standard) use static mapping performed on every frame in the HDR video content being streamed. However, every frame in the HDR video content is mapped using same mapping scheme, wherein a maximum brightness and a minimum brightness that can be expressed for every frame stays constant throughout the streaming of the HDR video content. This affects a viewing experience of the user. Thirdly, existing video streaming systems (such as Dolby Vision® or HDR10+) employ dynamic mapping for every frame in the HDR video content being streamed. Such dynamic mapping involves additional metadata which is used to adjust at least one of: a minimum brightness, a maximum brightness, a gamma curve shape, a colour reproduction information, of every frame in the HDR video content. However, such HDR video content can be viewed only when a compatible video player is employed, without which the HDR video content looks unnaturally saturated to extreme colours. Fourthly, existing video streaming systems use one-dimensional (1D) linear transformation to simply scale and shift colour channels (such as chroma and luminance channels), which leaves inefficiencies and unused bits. In particular, such transformations are unable to account for dynamic conditions of the HDR video content. Resultantly, there is a degradation in the HDR video content that leads to unrealistic, non-immersive viewing experience.

Therefore, in light of the foregoing discussion, there exists a need to overcome the aforementioned drawbacks.

SUMMARY

The aim of the present disclosure is to provide video transport methods and video transport systems, to minimize wastage of bits while transporting the HDR video content. The aim of the present disclosure is achieved by video transport methods and video transport systems as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
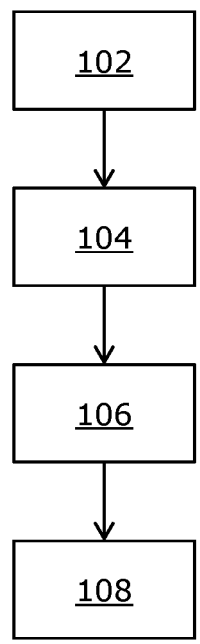
FIG. 1 illustrates steps of a video transport method implemented by a video transport system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a video transport method comprising:
  receiving high dynamic range (HDR) video content comprising a plurality of HDR images;
  performing HDR mastering for the plurality of HDR images according to HDR mastering parameters;
  transforming an input colour space of the plurality of HDR images into a transport colour space, by:
    plotting colour component values of pixels in a first HDR image amongst a given set of HDR images, across a multi-dimensional colour space, wherein different dimensions of the multi-dimensional colour space represent different colour components;
    identifying a bounding box corresponding to the first HDR image, wherein the bounding box encloses at least colour component values of two or more colour components represented in the multi-dimensional colour space;
    determining a transformation to be applied to the input colour space of the given set of HDR images such that upon applying the transformation, the colour component values enclosed in the bounding box utilise an entire dynamic range of the transport colour space;
    applying the transformation to each HDR image in the given set of HDR images; and
  transporting the plurality of HDR images having the transport colour space.

In a second aspect, the present disclosure provides a video transport system comprising at least one server that is communicably coupled to at least one of: a client device, a data repository, via a communication interface, wherein the at least one server is configured to:

receive high dynamic range (HDR) video content comprising a plurality of HDR images;

perform HDR mastering for the plurality of HDR images according to HDR mastering parameters;

transform an input colour space of the plurality of HDR images into a transport colour space, wherein for performing said transformation, the at least one server is configured to:

plot colour component values of pixels in a first HDR image amongst a given set of HDR images, across a multi-dimensional colour space, wherein different dimensions of the multi-dimensional colour space represent different colour components;

identify a bounding box corresponding to the first HDR image, wherein the bounding box encloses at least colour component values of two or more colour components represented in the multi-dimensional colour space;

determine a transformation to be applied to the input colour space of the given set of HDR images such that upon applying the transformation, the colour component values enclosed in the bounding box utilise an entire dynamic range of the transport colour space;

apply the transformation to each HDR image in the given set of HDR images; and transport the plurality of HDR images having the transport colour space to the at least one of: the client device, the data repository.

The present disclosure provides the aforementioned video transport method and the aforementioned video transport system. In the video transport method and the video transport system, the input colour space is beneficially transformed so that the input colour space of the plurality of HDR images is effectively transformed into the transport colour space, to form a tightly-fit bounding box that encloses all the colour components of the first HDR image in the given set of HDR images. Hence, a form of content-based encoding is performed, which minimizes wastage of bits. The transformation is performed on a per-frame basis in the given set of HDR images, so that the dynamic range and colour characteristics of the HDR video content are closely reproduced during viewing of the HDR video content. Moreover, the transformations are applied to beneficially properly utilise all the bits available in the transport colour space. Beneficially, at least one of: a manner in which, conditions subject to which, the HDR content is viewed, is taken into account for performing the HDR mastering. The video transport method and the video transport system are easy to implement, and can be used for streaming high-quality HDR video content to multiple client devices.

The video transport method is implemented by a video transport system. Throughout the present disclosure, the term "video transport system" refers to an infrastructure that is responsible for transporting (namely, moving) video content from one location to another location. Such infrastructure is any one of: a physical infrastructure, a digital infrastructure. The video transport system described herein is an extended-reality (XR) video transport system which enables transmitting a stream of XR images to at least one client device with minimal degradation in quality.

The HDR video content is received from at least one of: a data repository whereat the HDR video content is pre-stored, an HDR content framebuffer. It will be appreciated that each HDR image amongst the plurality of HDR images in the HDR video content is analysed to determine its luminance range (i.e., brightness range) and colour information, so that the transformation applied to each HDR image can be adjusted based at least on said information.

Throughout the present disclosure, the term "HDR mastering" refers to a process of optimizing and adjusting the HDR video content for transporting and/or displaying. The HDR mastering is performed according to the HDR mastering parameters, in order to ensure that each HDR image is presented in a best possible way. Herein, the HDR mastering is performed individually for each HDR image in the plurality of HDR images, since different HDR images may have different characteristics which need to be optimized differently.

Optionally, the HDR mastering parameters comprise at least one of: a shape of a tone-mapping curve, parameters of a tone-mapping curve, a luminosity range, colour characteristics, overall brightness, chromaticity, a shape of a gamma curve. Such HDR mastering parameters are beneficially adjustable to adjust a visual quality of the HDR video content. Each of these HDR mastering parameters is described in detail below. In this regard, the "tone-mapping curve" refers to a graphical representation of how luminance values in the dynamic range of an HDR image are mapped to a limited luminance range of the at least one display, while preserving as much detail and visual fidelity as possible. The shape of the tone-mapping curve determines how highlights and shadows in HDR image are compressed (or expanded) to fit within the limited luminance range. When the shape of the tone-mapping curve is adjusted, it affects how much detail is retained in the highlights and the shadows. The term "luminosity range" encompasses a plurality of luminosity values that lie between a lowest luminosity value and a highest luminosity value of pixels in an HDR image. When the luminosity range for the plurality of HDR images is adjusted, brightness levels (i.e., luminosities) in each HDR image is adjusted such that a quality of viewing the HDR image is optimized according to image content and viewing conditions.

Moreover, in a given viewing conditions, the colour characteristics can be adjusted for dynamically adapting HDR colour mapping to provide colour vividness and accuracy for each HDR image. This ensures that the HDR content appears visually pleasant to the user. Furthermore, adaptive algorithms may dynamically adjust the colour characteristics based on the dynamic range (i.e., the luminosity range) variations in different HDR images, ensuring consistent colour representation across the HDR video content. The term "overall brightness" for each HDR image refers to an overall luminance of said HDR image. The overall luminance could be an average luminance value of pixels in said HDR image, a perceived luminance value of said HDR image, or similar. The dynamic range variations in the HDR video content result in scenes with varying brightness ranging from extremely bright highlights to deep shadows, therefore adjusting the overall brightness could be performed to compensate for these variations to maintain a balanced luminance distribution across the HDR video content, to enhance perception of a particular portion of the dynamic range in a given HDR image, or similar. The colour characteristics can also impact the overall brightness. The "chromaticity" of an HDR image refers to a colour information present in the HDR image, specifically without considering its luminance. Adjusting the chromaticity may involve one or more of: scaling and/or shifting colour values to fit within a colour space, colour grading, colour mapping, and the like. The "gamma curve" refers to a mathematical function that, when applied to pixel values of an HDR image, optimizes the HDR image for viewing (on at least one display). The shape of the gamma curve indicates how the pixel values are transformed to achieve a desired output on the at least one display.

Throughout the present disclosure, the term "colour space" defines how colours are represented (using numerical values, percentages, or similar) and typically comprise a plurality of colour components, different colour components representing a different aspect of colour. The term "colour component" refers to an individual channel (or aspect) of the colour space which contributes towards an overall colour representation in an image. For example, the RGB colour space has three colour components, i.e., a red colour component (R), a green colour component (G), and a blue colour component (B). Moreover, the term "input colour space" refers to a colour representation that is used to encode the plurality of HDR images initially. The term "transport colour space" refers to a standardised colour representation that is used for transporting the plurality of HDR images. Herein, the transport colour space is determined based on at least one of: a compatibility, a consistency, in representing the colour component of the plurality of HDR images across different client devices. The input colour space and transport colour space are the same colour space, but with different dynamic ranges.

In this regard, the input colour space of the plurality of HDR images is transformed into the transport colour space to ensure uniformity or compatibility during transmission. Hence, the plurality of HDR images can be accurately represented on a wide range of devices while preserving their colour fidelity and dynamic range. The transformation of the input colour space of the plurality of HDR images into the transport colour space is dynamic, i.e., such transformation could be different for each HDR image. Herein, transformation of the colour space for the plurality of HDR images is based on colour component values in the first HDR image amongst the given set of HDR images. It will be appreciated that the plurality of HDR images can have at least one set of HDR images. In an instance when the given set is a single set, same transformation is applied to all HDR images in the set, said transformation being determined based on the first HDR image in the plurality of images. In another instance when the given set are two or more sets, same transformation is applied to all HDR images in each set, said transformation being determined based on a first HDR image in that set.

Optionally, the input colour space is one of: a Red-Green-Blue (RGB) colour space, a luminance-chrominance (YUV) colour space, a Hue-Saturation-Value (HSV) colour space, a Cyan-Magenta-Yellow (CMY) colour space. A technical effect of providing different options for input colour space is that a wide range of colours can be produced using the input colour space. Herein, the RGB colour space has three colour components, i.e., a red colour component (R), a green colour component (G), and a blue colour component (B). For example, in an 8-bit colour depth, a given colour component value of a given colour component may lie in a range of 0-255, and is chosen from amongst a total of 256 values. The YUV colour space has three colour components, i.e., a luminance colour component (Y) and two chrominance colour components (UV), wherein the U colour component represents a colour-blue difference, and the V colour component represents a colour-red difference. For example, in an 8-bit colour depth, the Y colour component may lie in a range of 0-255 (wherein 0 represents black colour component and 255 represents white colour component), and the UV colour components may lie in a range of -128 to 127 (wherein negative values represents a shift towards blue colour component, and positive values represents a shift towards red colour component).

Moreover, the HSV colour space has three colour components, i.e., a hue colour component (H), a saturation colour component(S), and a value colour component (V). Herein, the H colour component represents a pure colour of light which is independent of brightness or intensity, the S colour component refers to a purity (i.e., vividness or dullness) of the colour component, and the V colour component represents a brightness (i.e., lightness or darkness) of the colour component. For example, the H colour component may lie in a range of 0 degrees to 360 degrees (wherein the red colour component may be at 0 degree, the green colour component may be at 120 degrees, and the blue colour component may be 240 degrees), the S colour component may lie in a range of 0 percent to 100 percent of a purest form of the colour components, and the V colour component may lie in a range of 0 percent to 100 percent of total intensity of the colour components. The CMY colour space has three colour components, i.e., a cyan colour component (C), a magenta colour component (M), a yellow colour component (Y). In this regard, the colour components are created by subtracting varying amounts of the three colour components from white colour component. For example, a given colour component may lie in a range of 0 to 1, wherein 0 indicates that no given colour component is applied, and 1 indicates that the given colour component is applied in full.

The term "colour component values" refers to illumination values of the pixels in the first HDR image amongst the given set of HDR images which encompasses colour values (namely, intensities) of the pixels, and luminance values (for example, such as a hue value, a saturation value, and a lightness value), a transparency value, or similar, of the pixels. The term "multi-dimensional colour space" encompasses a two-dimensional (2D) colour space and a three-dimensional (3D) colour space. Herein, one dimension of the multi-dimensional colour space represents one axis of the multi-dimensional colour space. When the multi-dimensional colour space is one of: the RGB colour space, the YUV colour space, the HSV colour space, the CMY colour space, R, G, B, Y, U, C etc. are individual colour components of the multi-dimensional colour space.

In this regard, to plot the colour component values of the pixels in the first HDR image, each pixel's colour component value in the first HDR image is represented using multiple dimensions corresponding to the different colour components. The colour component values are plotted on a multi-dimensional plane lying, for example, in a range of -1 to +1. In a first example, the multi-dimensional colour space may be a 2D YUV colour space, wherein the UV colour component values of each pixel in the 2D YUV colour space may be expressed as 2D coordinates on the multi-dimensional plane. In a second example, the multi-dimensional colour space may be a 3D YUV colour space, the YUV colour component values of each pixel in the 3D YUV colour space may be expressed as 3D coordinates on the multi-dimensional plane.

The term "bounding box" is defined by a minimum value and a maximum value along each dimension of the multi-dimensional colour space, thereby creating a box-like region corresponding to the first HDR image, wherein the bounding box encloses the colour component values of the two or more colour components. The bounding box is a 2D bounding box when the multi-dimensional colour space is the 2D colour space, and a 3D bounding box when the multi-dimensional colour space is the 3D colour space. Herein, to identify the bounding box, the colour component values that are represented in the multi-dimensional colour space are scanned to determine the minimum value and the maximum value for each of the two or more colour components in the multi-dimensional colour space. Such minimum and maximum values are then used to define vertices of the bounding box. The two or more colour component values are enclosed by the bounding box to ensure that an entire range of colours present in each HDR image is considered. Moreover, it is determined which colour component amongst the two or more colour components has a wider range, based on a variation between their minimum value and their maximum value. A technical effect of identifying the bounding box in such a manner is that it ensures comprehensive coverage of the multi-dimensional colour space and preserves integrity of each HDR image during subsequent transformations.

Continuing in reference to the first example, the UV colour component values of the pixels may be plotted on the multi-dimensional plane, and the minimum value and the maximum value of the UV colour components may be determined to identify the bounding box enclosing the UV colour component values of the two or more colour components.

The transformation is determined to be applied to the to adjust a colour representation of the input colour space for the given set of HDR images in order to scale or map said colour component values according to the dynamic range of the transport colour space. Herein, the transformation is typically any one of: a normalization process, a mapping process. Herein, the dynamic range is a limited range of the transport colour space. The term "dynamic range" of the transport colour space refers a range of colours that can be represented in the transport colour space. The colour component values that are enclosed in the bounding box are utilised for the entire dynamic range of the transport colour space to ensure that a visual richness of the first HDR image in the given set of HDR images is maintained by maximising visual fidelity of the first HDR image during transportation.

Optionally, the first transformation is one of: a two-dimensional affine linear transformation, a three-dimensional affine linear transformation. When the transformation is the two-dimensional (2D) affine linear transformation, the colour component values are adjusted using a 2-by-2 matrix. Herein, the 2D affine linear transformation involves various operations, for example, such as a scaling operation, a rotating operation, a shearing operation, and a translating operation, for two colour components enclosed in the bounding box represented in the 2D colour space. The 2D affine linear transformation is used for manipulating the two colour component values in each HDR image. When the transformation is the three-dimensional (3D) affine linear transformation, the colour component values are adjusted using a 3-by-3 matrix. Herein, the operations involved in the 3D affine linear transformation are similar to or different from the operations involved in the 2D affine linear transformation, for two or more colour components (for example, such as three colour components) enclosed in the bounding box in the 3D colour space. The 3D affine linear transformation is used for manipulating the two or more colour component values in each HDR image.

In this regard, by adjusting the colour component values using one of: the 2D affine linear transformation, the 3D affine linear transformation, the entire dynamic range of colours available in the transport colour space can be utilised. A technical effect of the transformation being one of: the 2D affine linear transformation, the 3D affine linear transformation, is that the colour component values can be effectively manipulated to provide precise adjustment to the colour component values, which allows for accurate mapping to the transport colour space.

The determined transformation is then executed individually on each HDR image in the given set of HDR images, to adjust the colour representation of each image accordingly. The transformation is applied in such a manner to ensure consistency in mapping the colour component values across the plurality of HDR images, and to facilitate accurate representation of the HDR video content within the transport colour space.

Optionally, the step of determining the transformation to be applied to the input colour space of the given set of HDR images in the bounding box further comprises at least one of:
  translating the colour component values according to the dynamic range of the transport colour space;
  rotating the colour component values according to the dynamic range of the transport colour space;
  scaling the colour component values according to the dynamic range of the transport colour space;
  adjusting a function that maps the colour component values to the dynamic range of the transport colour space, based on a density pattern of the colour component values, and mapping the colour component values to the dynamic range of the transport colour space using the adjusted function.

Herein, translating the colour component values involves shifting the entire range of the colour component values by a predefined amount along each dimension representing a colour component to align with the dynamic range of the transport colour space. Such translation ensures that extremes of the input colour space are mapped to corresponding extremes of the transport colour space. Additionally, the colour component values are scaled to adjust a range of the colour component values along each dimension of the multi-dimensional colour space to match the dynamic range of the transport colour space. Such scaling ensures that the entire range of the colour component values in given set of HDR images is proportionally mapped to the dynamic range of the transport colour space.

Continuing in reference to the first example, upon determining that translating and shifting are to be applied to the input colour space of the given set of HDR images, the minimum values of the UV colour components may correspond to (0,0) in the transport colour space, and the maximum values of the UV colour components may correspond to (1, 1) (or a maximum value for transport colour data in the transport colour space) in the transport colour space.

Moreover, the colour component values are rotated by rotating axes of the multi-dimensional colour space to better align with the dynamic range of the transport colour space, such that the bounding box is aligned with the dimension of that colour component which has the wider range amongst the two or more colour components. Moreover, the term "density pattern" refers to a distribution or a concentration of the colour component values within the given set of HDR images, wherein such density pattern indicates how densely a particular colour component value occurs across the given of HDR images. Herein, the density pattern is highest where there are most samples in the first HDR image (namely, a source frame). Based on the density pattern, the function maps the colour component values from the input colour space into the corresponding colour component values of the transport colour space. Beneficially, application of the function allows handling of outliers in each dimension without sacrificing a quality of the rest of the HDR content. Herein, the function is any one of: a mathematical equation, an algorithm. The function is adjusted based on the density pattern of the colour component values, using techniques that are well-known in the art. Examples of such techniques may include, but are not limited to, a statistical analysis technique, a pattern recognition technique, a machine learning algorithm, and similar. Subsequently, at least one parameter of the function is adjusted to accommodate a distribution of the colour component values. For example, the U component values in an HDR image may be 0.01, 0.05, 0.1, 0.11 and 5.0, then a function $f(x)=1/x$ shaped function.

A technical effect of determining the transformation to be applied to the input colour space of the given set of HDR images in such a manner is that colour fidelity is preserved effectively based on the method determined to be applied for the transformation, to accurately reproduce the colour component values in the transport colour space. This also helps in minimizing artefacts when finally applying the transformation to the colour component values to each HDR image in the given set of HDR images.

Optionally, the function is a parametric function which is adjustable for each image according to colour component values of each image (i.e., each HDR image), the parametric function being received as a metadata along with the HDR video content. Herein, each HDR image is in the given set of HDR images. Moreover, the term "parametric function" refers to a non-linear function which is adjustable according to the colour component values of each HDR image. Hence, the parametric function is dynamically modifiable based on the distribution of the colour component values of each HDR image. Such adjustment of the parametric function is performed by employing previously mentioned techniques. Examples of the at least one parameter may include, but are not limited to, a gamma correction parameter, a colour space conversion parameter, and a tone mapping parameter. The parametric function is received at the at least one server as metadata along with the HDR video content, which ensures that transformation is applied to the colour component values in a consistent manner. This is beneficial in maintaining an integrity of the HDR video content across different viewing experiences. For example, the parametric function may be a polynomial function with both positive and negative degrees, for example, $f(x)=ax^{-2}+bx^{-1}+c+dx+ex^2$.

A technical effect of using the parametric function in such a manner is that such parametric functions can be adjusted based on the characteristics of each HDR image, thereby enabling an accurate representation of the colour component values in the transport colour space.

Optionally, the step of transforming the input colour space of the plurality of HDR images further comprises skewing the bounding box towards a dimension representing a colour component with a widest range of colour component values amongst the two or more colour components. In this regard, skewing the bounding box involves adjusting at least one of: a shape, a position, of the bounding box towards said dimension. Herein, the dimension that represents the widest range of colour component values is identified. The bounding box is then skewed towards this dimension, which effectively stretches or elongates said bounding box to encompass the widest range of colour component values along that dimension. The bounding box is skewed in such a manner so that a full spectrum of colours present in the plurality HDR images is accurately represented in the transport colour space. Herein, the skewing would produce a tightly-fit bounding box, based on width of ranges of the colour component values. Beneficially, this results in high colour accuracy when transporting the plurality of HDR images, as the bounding box preserves detail of each HDR image which improves an overall quality of each HDR image.

For example, the bounding box may be the 2D bounding box, wherein the 2D bounding box is in a form of an elongated rectangle. The bounding box may comprise a grid having 1024 cells in both dimensions of a 2D colour space. Since the 2D bounding box is in the form of the elongated rectangle, the grid may be dense in a particular direction and sparse in another particular direction. However, if the bounding box is skewed so that samples having the widest colour range are aligned with a diagonal of the 2D bounding box, the samples may be placed on a significantly denser grid.

Optionally, the video transport method further comprises compressing the plurality of HDR images having the transport colour space by:
  setting sampling resolutions for all colour components in the input colour space such that the colour component with the widest range has a highest sampling resolution amongst the sampling resolutions; and
  sampling all the colour components according to their corresponding sampling resolutions, wherein a portion of a number of bits per sample for the colour component with the widest range is re-allocated to one or more other colour components.

In this regard, the plurality of HDR images that have already been transformed into the transport colour space are compressed. Herein, the plurality of HDR images are compressed to enable efficient bandwidth usage and faster transportation (as compared to un-compressed transmission). The term "sampling resolution" refers to a level of precision at which the colour component values are discretized, wherein the sampling resolution is used to determine a number of discrete values that can be represented for each colour component. For example, higher sampling resolutions may result in a finer level of precision in colour representation. The sampling resolutions are set based on characteristics of all the colour components in the input colour space, which ensures an accurate representation of colour components during the compression of the plurality of HDR images after transformation. Herein, the colour component with the widest range is represented by the dimension towards which the bounding box is skewed.

Moreover, the portion of the number of bits per sample that is allocated for the colour component with the widest range is reassigned to optimize a use of available bits, which ensures that each colour component is represented accurately while minimising data redundancy. This is used for increasing a bit depth of the one or more other colour components. Beneficially, by setting the sampling resolutions and re-allocating the portion of the number of bits per sample, an amount of data required to represent the colour components can be reduced without significantly comprising visual quality.

For example, in a 3D YUV colour space, the Y colour component may be taken into consideration, and a 4-by-4 transformation matrix may be used to identify a 3D bounding box that encloses the YUV colour components in each HDR image. Herein, the Y colour component may typically be transported at a higher spatial resolution than the UV colour components (for example, in a 4:2:2 mode). Hence, a portion of the number of bits from the Y colour component is re-allocated from the Y colour component to provide extra resolution for the UV colour components.

Optionally, the step of transforming the input colour space of the plurality of HDR images into the transport colour space further comprises adjusting a size of the bounding box by at least one of:

increasing the size of the bounding box by a predefined extent, such that the bounding box also encloses additional colour component values surrounding the colour component values of two or more colour components; and increasing the size of the bounding box such that the bounding box also encloses previous colour component values of pixels in at least one previous HDR image, wherein the at least one previous HDR image is received prior to receiving the first HDR image.

In an instance, when the size of the bounding box is increased by the predefined extent, the tightly-fit bounding box is expanded to accommodate for potential variations of remaining HDR images in the given set of HDR images. Herein, the term "predefined extent" refers to a particular margin which accounts for slight variations in distribution of the additional colour component values surrounding the colour component values of the first HDR image. The predefined extent could be a percentage by which the size of the bounding box is adjusted. Optionally, the predefined extent lies in a range of 1 percent to 50 percent of maximum colour range of the two or more colour components. Herein, the maximum colour range of the two or more colour components is an absolute colour range. In other words, the maximum colour range of the two or more colour components is relative to a full allowed colour range of the pixels in the first HDR image amongst the given set of HDR images. As an example, the size of the bounding box may be increased by 10 percent of original dimension of the bounding box to enclose the additional colour component.

In another instance, when the size of the bounding box is increased to enclose the previous colour component values, the tightly-fit bounding box is expanded to accommodate colour component values of pixels of the at least one previous HDR image. Herein, the at least one previous HDR image is processed before processing of the first HDR image, wherein the at least one previous HDR image is similar to or different from the first HDR image. Hence, by adjusting the size of the bounding box based on the previous colour component values, historical colour data from the at least one previous HDR image is leveraged to achieve a consistent transformation.

A technical effect of adjusting the size of the bounding box in such a manner is that a broad range of colour component values can be captured using the two aforementioned processes, thereby preventing any data loss.

Optionally, the step of transforming the input colour space of the plurality of HDR images into the transport colour space further comprises defining the given set of HDR images to comprise one of:

a single HDR image, wherein the single HDR image is the first HDR image;

two or more HDR images comprising the first HDR image and at least one remaining HDR image, wherein a number of HDR images in the at least one remaining HDR image lies within a predefined range;

two or more HDR images comprising the first HDR image and at least one remaining HDR image, wherein a number of HDR images in the at least one remaining HDR image is dynamically adjusted by performing, for each remaining HDR image:

plotting colour component values of pixels in said remaining HDR image, across the multi-dimensional colour space;

identifying a test bounding box corresponding to said remaining HDR image, wherein the test bounding box encloses the colour component values of pixels in said remaining HDR image;

determining whether a size of the test bounding box is greater than the bounding box;

when the size of the test bounding box is greater than the bounding box, terminating the given set of HDR images at said remaining HDR image such that the given set of HDR images excludes the remaining HDR image, and said remaining HDR image serves as a next first HDR image of a next given set of HDR images.

Herein, a number of HDR images that could be present in the given set of HDR images is defined, wherein there may be three options. As a first option, the given set of HDR images could comprise the single HDR image, wherein a bounding box is identified for every such single HDR image in the given set of HDR images.

As a second option, the given set of HDR images comprises a defined number of HDR images. Herein, the first HDR image is identified, wherein the first HDR image could be sequentially the first image in the two or more HDR images, or could be an HDR image having a particular number of colour component values. It will be appreciated that each bounding box of each of the at least one remaining HDR image overlaps the bounding box corresponding to the first HDR image by a certain extent (for example, such as more than 50 percent of overlapping). Herein, the colour component values of the first HDR image is plotted to allow as much similarity between successive frames as possible for efficient encoding. Optionally, the predefined range comprises at least 2 HDR images. As an example, the predefined range is from 2 HDR images to 4096 HDR images. As another example, the predefined range is from 16 HDR images to 512 HDR images.

As a third option, the given set of HDR images comprises an undefined number of HDR images. Herein, the first HDR image is identified in a manner similar to the manner as described above. Herein, for each remaining HDR image in the given set of HDR images, the colour component values of the pixels in said remaining HDR image is plotted in a manner similar to plotting of the colour component values of the pixels in the first HDR image, as described in detail above. Subsequently, the test bounding box is identified, wherein the test bounding box is similar to the bounding box (as described above), but the test bounding box is identified for said remaining HDR image. Hence, the test bounding box could be similar to or different from the bounding box. The test bounding box is identified in a manner similar to a manner in which the bounding box is identified, which is described in detail above. When it is determined that the size of the test bounding box is greater than the bounding box, said remaining HDR image is excluded from the given set of HDR images. Instead, said remaining HDR images is inserted as a keyframe (namely, an I-frame) for the next given set of HDR images. In other words, the given set of HDR images closes with a particular HDR image that was processed just before said HDR image, and the next set of HDR images starts with said HDR image having the test bounding box greater than the bounding box. Hence, the number of HDR images can be dynamically adjusted, wherein the given set of HDR images has a variable range.

A technical effect of defining the given set of HDR images in such a manner is that given set of HDR images can account for any possibility, thus ensuring adaptability and efficiency when transforming the input colour space of the plurality of HDR images into the transport colour space.

The plurality of HDR images are transported to the at least one client device (as described in detail later) to facilitate various purposes, for example, such as distribution, storage, processing, or display. The plurality of HDR images are transported using communication protocol, depending on a particular requirement of the at least one client device. Examples of the communication protocol may include, but are not limited to, local area networks (LANs), wide area networks (WANs), TCP/IP, UDP, and HTTP.

Optionally, the video transport method further comprises obtaining, from at least one client device, a stream of viewing condition metadata comprising at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the at least one client device is used, display screen capabilities;
 wherein the step of determining the transformation to be applied to the input colour space is performed on a per-frame basis, based on the viewing condition metadata,
 and wherein the step of transporting the plurality of HDR images having the transport colour space comprises sending a stream of the plurality of HDR images having the transport colour space to the at least one client device.

The at least one client device could be implemented as a display device, or as another computing device serving the display device. Optionally, the at least one client device is a storage device in a case of transcoding. Examples of the display device include, but are not limited to, a head-mounted display (HMD) device, and a smartphone. As an example, a smartphone can be inserted into a viewing apparatus made from cardboard, to display image frames to the user. The term "head-mounted display" device refers to a specialized equipment that is configured to present an XR environment to a user when said HMD device, in operation, is worn by a user on his/her head. The HMD device is implemented, for example, as an XR headset, a pair of XR glasses, and the like, that is operable to display a scene of the XR environment to the user. The XR environment is presented by displaying the plurality of XR images on the at least one display of the at least one client device. Herein, the term "extended-reality" encompasses augmented reality (AR), mixed reality (MR), and the like.

Optionally, when the at least one client device is the HMD device, the HDR video content is virtual reality (VR) video content. This means that in this case, the plurality of HDR images represent a plurality of virtual objects. Such virtual objects could be fully computer-generated, computer-enhanced representations of real objects, or similar. It will be appreciated that the at least one client device comprises at least one processor that is configured to implement the aforementioned processing steps associated with the at least one client device.

The term "viewing condition metadata" refers to a metadata that is received by the at least one server from the at least one client device, such metadata being beneficially utilised by the at least one server for adjusting the HDR mastering parameters for each HDR image according to the viewing conditions indicated in said metadata. The viewing conditions describe how the HDR video content is being viewed at the at least one client device, and it could encompass one or more of user-related viewing conditions, real-world environment-related viewing conditions, and hardware-related viewing conditions. The viewing conditions impact a quality with which the HDR video content is perceived by the user of the at least one client device, and thus taking them into account when determining the transformation to be applied to the input colour space for each HDR image (of the HDR video content) in the given set of HDR images. Moreover, the HDR mastering is performed in a manner that the HDR video content is perceivable with high-quality by the user of the at least one client device, when the plurality of HDR images is transported to the at least one client device. Moreover, each constituent of the viewing condition metadata effectively describes a viewing condition which significantly impact the quality with which the HDR video content is viewed at the at least one client device, when the stream of the plurality of the HDR images is sent to the at least one client device.

In this regard, the gaze point of the user's eyes is a point at which the user's eyes are focused, when viewing the HDR video content. A manner in which the gaze point of the user's eyes changes over a period of time is indicative of at least one of: a gaze velocity, a gaze acceleration, a gaze momentum. Furthermore, the size of the pupils of the user's eyes indicates one or more of: brightness adaptation, dynamic range perception, contrast sensitivity, and visual comfort, of the user's eyes, with respect to the HDR video content. Optionally, a processor of the at least one client device is configured to process gaze-tracking data, collected by a gaze-tracking means of the client device, to determine the gaze point of the user's eyes and/or the size of the pupils of the user's eyes. The gaze-tracking data is processed to determine gaze directions of the user's eyes, wherein the gaze point is a point of convergence of the gaze directions. The term "gaze-tracking means" refers to a specialized equipment for detecting and/or following a gaze of the user, when the at least one client device in operation is worn by the user. The gaze-tracking means could be implemented as contact lenses with sensors, cameras monitoring a position, a size and/or a shape of a pupil of a given eye of the user, and the like. Such gaze-tracking means are well-known in the art.

Furthermore, optionally, the processor of the at least one client device is configured to estimate the luminosity ranges receivable by the user's eyes, based on the size of the pupils of the user's eyes and calibration information. By monitoring how the size of the pupils changes upon viewing various pre-known luminosities in XR images, a luminosity perception of the user can be determined. The estimation of the luminosity ranges receivable by the user's eyes is based on this luminosity perception.

Optionally, a pose-tracking means of the at least one client device, in operation, collects the head-pose tracking data. The head-pose tracking data indicates the pose of the user's head, which provides insight of a perspective from which the user views an XR environment presented by the at least one client device. Herein, the term "pose" comprises position and/or orientation. The head-pose tracking data is optionally also indicative of at least one of: a velocity, an acceleration, a momentum, of the user's head. The pose-tracking means could be implemented as an internal component of the at least one client device (for example, such as an inertial measurement unit, a global positioning system receiver, or similar), as a tracking system external to the at least one client device (for example, such as a camera), or as a combination thereof (for example, such as a detector and a detectable object, one of which is arranged on/in the at least one client device and the other of which is external to the at least one client device).

Optionally, the processor of the at least one client device is configured to process sensor data, collected by at least one light sensor arranged on the at least one client device and/or in the real-world environment where the at least one client device is used, to determine the lighting conditions in said real-world environment.

The term "display screen capabilities" refers to specifications of the at least one display of the at least one client device that determine its ability to show the HDR visual content. Optionally, the display screen capabilities include one or more of: a peak brightness (expressed, for example, in nits), a black level (expressed, for example, in nits), a contrast ratio, a colour gamut, a bit depth of colour channels (i.e., colour components), a HDR format support, a HDR certification, of the at least one display. Some examples of the colour gamut include, but are not limited to, sRGB, AdobeRGB®, DCI-P3, and Rec.2020.

The present disclosure also relates to the video streaming system as described above. Various embodiments and variants disclosed above, with respect to the aforementioned video streaming method, apply mutatis mutandis to the video streaming system.

In some implementations, the at least one server is implemented as a remote server. In an example, the remote server could be a cloud server that provides a cloud computing service, and could be arranged in a geographical location that is different from a geographical location of the at least one of: the at least one client device, the data repository. In other implementations, the at least one server is implemented as a processor of a computing device that is communicably coupled to the at least one client device. Examples of the computing device include, but are not limited to, a laptop, a desktop, a tablet, a phablet, a personal digital assistant, a workstation, and a console. It will be appreciated that the term "at least one server" refers to "a single server" in some implementations, and to "a plurality of servers" in other implementations. It will be appreciated that the at least one server comprises at least one processor that is configured to implement the aforementioned processing steps associated with the at least one server. Optionally, the at least one processor of the at least one server comprises at least one Graphics Processing Unit (GPU).

The communication interface which communicably couples the at least one server with the client device may be a wired communication interface, a wireless communication interface, or a combination of these. Examples of the communication interface may include, Ethernet, Internet, Wi-Fi, Bluetooth®, Near Field Communication (NFC), and the like. It will be appreciated that a bandwidth and a latency of the communication interface is suitable to support provision of a seamless video transporting experience to users.

The term "data repository" refers to a hardware, a software, a firmware, or a combination of these for storing the HDR video content comprising the plurality of HDR images in an organized (namely, structured) manner, thereby, allowing for easy storage, access (namely, retrieval), updating and analysis of the HDR video content. The data repository may be implemented as a memory of the video transport system, a removable memory, a cloud-based database, or similar. The data repository can be implemented as one or more storage devices. An example of the data repository may be a hard drive, an optical disk (for example, such as Blu-Ray Disc®), a tape. A technical advantage of using the data repository is that it provides an ease of storage and access of processing the HDR video content, as well as processing each HDR image amongst the plurality of HDR images.

Optionally, when transforming the input colour space of the plurality of HDR images, the at least one server is further configured to skew the bounding box towards a dimension representing a colour component with a widest range of colour component values amongst the two or more colour components.

Optionally, the at least one server is further configured to compress the plurality of HDR images having the transport colour space by:
setting sampling resolutions for all colour components in the input colour space such that the colour component with the widest range has a highest sampling resolution amongst the sampling resolutions; and
sampling all the colour components according to their corresponding sampling resolutions, wherein a portion of a number of bits per sample for the colour component with the widest range is re-allocated to one or more other colour components.

Optionally, the transformation is one of: a two-dimensional affine linear transformation, a three-dimensional affine linear transformation.

Optionally, when determining the transformation to be applied to the input colour space of the given set of HDR images further, the at least one server is configured to at least one of:
translate the colour component values according to the dynamic range of the transport colour space;
rotate the colour component values according to the dynamic range of the transport colour space;
scale the colour component values according to the dynamic range of the transport colour space;
adjust a function that maps the colour component values to the dynamic range of the transport colour space, based on a density pattern of the colour component values, and mapping the colour component values to the dynamic range of the transport colour space using the adjusted function.

Optionally, the function is a parametric function which is adjustable for each image according to colour component values of each HDR image, the parametric function being received as a metadata along with the HDR video content.

Optionally, the at least one server is further configured to obtain, from the at least one client device, a stream of viewing condition metadata comprising at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the at least one client device is used, display screen capabilities;
wherein when determining the transformation to be applied to the input colour space, the at least one server is configured to perform said transformation to the colour component on a per-frame basis, based on the viewing condition metadata,
and wherein when transporting the plurality of HDR images having the transport colour space, the at least one server is configured to send a stream of the plurality of HDR images having the transport colour space to the at least one client device.

Optionally, when transforming the input colour space of the plurality of HDR images into the transport colour space, the at least one server is further configured to adjust a size of the bounding box by at least one of:

increasing the size of the bounding box by a predefined extent, such that the bounding box also encloses additional colour component values surrounding the colour component values of two or more colour components; and increasing the size of the bounding box such that the bounding box also encloses previous colour component values of pixels in at least one previous HDR image, wherein the at least one previous HDR image is received prior to receiving the first HDR image.

Optionally, when transforming the input colour space of the plurality of HDR images into the transport colour space, the at least one server is further configured to define the given set of HDR images to comprise one of:

a single HDR image, wherein the single HDR image is the first HDR image;

two or more HDR images comprising the first HDR image and at least one remaining HDR image, wherein a number of HDR images in the at least one remaining HDR image lies within a predefined range;

two or more HDR images comprising the first HDR image and at least one remaining HDR image, wherein a number of HDR images in the at least one remaining HDR image is dynamically adjusted, wherein the at least one server is configured to perform, for each remaining HDR image:

plot colour component values of pixels in said remaining HDR image, across the multi-dimensional colour space;

identify a test bounding box corresponding to said remaining HDR image, wherein the test bounding box encloses the colour component values of pixels in said remaining HDR image;

determine whether a size of the test bounding box is greater than the bounding box;

when the size of the test bounding box is greater than the bounding box, terminate the given set of HDR images at said remaining HDR image such that the given set of HDR images excludes the remaining HDR image, and said remaining HDR image serves as a next first HDR image of a next given set of HDR images.

DETAILED DESCRIPTION OF THE DRAWINGS

Referring to FIG. 1, there are illustrated steps of a video transport method implemented by a video transport system, in accordance with an embodiment of the present disclosure. At step 102, high dynamic range (HDR) video content comprising a plurality of HDR images is received. At step 104, HDR mastering for the plurality of HDR images is performed according to HDR mastering parameters. At step 106, an input colour space of the plurality of HDR images is transformed into a transport colour space. This transformation is performed, by: plotting colour component values of pixels in a first HDR image amongst a given set of HDR images, across a multi-dimensional colour space, wherein different dimensions of the multi-dimensional colour space represent different colour components; identifying a bounding box corresponding to the first HDR image, wherein the bounding box encloses colour component values of two or more colour components represented in the multi-dimensional colour space; determining a transformation to be applied to the input colour space of the given set of HDR images such that upon applying the transformation, the colour component values enclosed in the bounding box utilise an entire dynamic range of the transport colour space;

the transformation is applied to each HDR image in the given set of HDR images. At step 108, the plurality of HDR images having the transport colour space are transported.

The aforementioned steps are only illustrative and other alternatives can also be provided where one or more steps are added, one or more steps are removed, or one or more steps are provided in a different sequence without departing from the scope of the claims herein.

Figure 2:
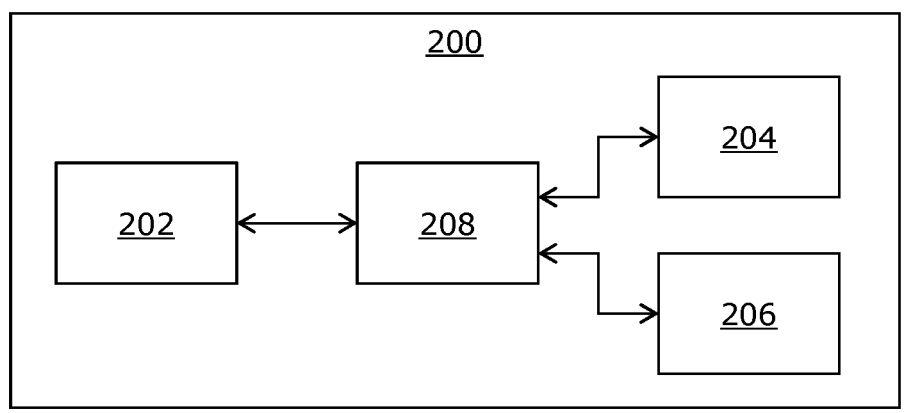
FIG. 2 is a block diagram of an architecture of a video transport system, in accordance with an embodiment of the present disclosure.

Referring to FIG. 2, there is a block diagram of an architecture of a video transport system 200, in accordance with an embodiment of the present disclosure. The video transport system 200 comprises at least one server (depicted as a server 202), and at least one of: a client device 204, a data repository 206. The at least one of: the client device 204, the data repository 206, is communicably coupled to the server 202, via a communication interface 208. The server 202 is configured to perform various operations, as described earlier with respect to the aforementioned second aspect.

It may be understood by a person skilled in the art that the FIG. 2 include a simplified architecture of the video transport system 200 for sake of clarity, which should not unduly limit the scope of the claims herein. It is to be understood that the specific implementation of the video transport system 200 is provided as an example and is not to be construed as limiting it to specific numbers or types of client devices and data repositories. The person skilled in the art will recognize many variations, alternatives, and modifications of embodiments of the present disclosure.

The invention claimed is:

1. A video transport method comprising:
receiving high dynamic range (HDR) video content comprising a plurality of HDR images;
performing HDR mastering for the plurality of HDR images according to HDR mastering parameters;
transforming an input colour space of the plurality of HDR images into a transport colour space, by:
plotting colour component values of pixels in a first HDR image amongst a given set of HDR images, across a multi-dimensional colour space, wherein different dimensions of the multi-dimensional colour space represent different colour components;
identifying a bounding box corresponding to the first HDR image, wherein the bounding box encloses at least colour component values of two or more colour components represented in the multi-dimensional colour space;
skewing the bounding box towards a dimension representing a colour component with a widest range of colour component values amongst the two or more colour components;
determining a transformation to be applied to the input colour space of the given set of HDR images such that upon applying the transformation, the colour component values enclosed in the bounding box utilise an entire dynamic range of the transport colour space;
applying the transformation to each HDR image in the given set of HDR images; compressing the plurality of HDR images having the transport colour space by:
setting sampling resolutions for all colour components in the input colour space such that the colour component with the widest range has a highest sampling resolution amongst the sampling resolutions; and
sampling all the colour components according to their corresponding sampling resolutions, wherein a portion of a number of bits per sample for the colour component with the widest range is re-allocated to one or more other colour components; and transporting the plurality of HDR images having the transport colour space.

2. The video transport method of claim 1, wherein the input colour space is one of: a Red-Green-Blue (RGB) colour space, a luminance-chrominance (YUV) colour space, a Hue-Saturation-Value (HSV) colour space, a Cyan-Magenta-Yellow (CMY) colour space.

3. The video transport method of claim 1, wherein the transformation is one of: a two-dimensional affine linear transformation, a three-dimensional affine linear transformation.

4. The video transport method of claim 1, wherein the step of determining the transformation to be applied to the input colour space of the given set of HDR images further comprises at least one of:

translating the colour component values according to the dynamic range of the transport colour space;
rotating the colour component values according to the dynamic range of the transport colour space;
scaling the colour component values according to the dynamic range of the transport colour space;
adjusting a function that maps the colour component values to the dynamic range of the transport colour space, based on a density pattern of the colour component values, and mapping the colour component values to the dynamic range of the transport colour space using the adjusted function.

5. The video transport method of claim 4, wherein the function is a parametric function which is adjustable for each image according to colour component values of each HDR image, the parametric function being received as a metadata along with the HDR video content.

6. The video transport method of claim 1, further comprising obtaining, from at least one client device, a stream of viewing condition metadata comprising at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the at least one client device is used, display screen capabilities;

wherein the step of determining the transformation to be applied to the input colour space is performed on a per-frame basis, based on the viewing condition metadata,
and wherein the step of transporting the plurality of HDR images having the transport colour space comprises sending a stream of the plurality of HDR images having the transport colour space to the at least one client device.

7. The video transport method of claim 1, wherein the step of transforming the input colour space of the plurality of HDR images into the transport colour space further comprises adjusting a size of the bounding box by at least one of:

increasing the size of the bounding box by a predefined extent, such that the bounding box also encloses additional colour component values surrounding the colour component values of two or more colour components; and
increasing the size of the bounding box such that the bounding box also encloses previous colour component values of pixels in at least one previous HDR image, wherein the at least one previous HDR image is received prior to receiving the first HDR image.

8. The video transport method of claim 1, wherein the step of transforming the input colour space of the plurality of HDR images into the transport colour space further comprises defining the given set of HDR images to comprise one of:

a single HDR image, wherein the single HDR image is the first HDR image;
two or more HDR images comprising the first HDR image and at least one remaining HDR image, wherein a number of HDR images in the at least one remaining HDR image lies within a predefined range;
two or more HDR images comprising the first HDR image and at least one remaining HDR image, wherein a number of HDR images in the at least one remaining HDR image is dynamically adjusted by performing, for each remaining HDR image:
plotting colour component values of pixels in said remaining HDR image, across the multi-dimensional colour space;
identifying a test bounding box corresponding to said remaining HDR image, wherein the test bounding box encloses the colour component values of pixels in said remaining HDR image;
determining whether a size of the test bounding box is greater than the bounding box;
when the size of the test bounding box is greater than the bounding box, terminating the given set of HDR images at said remaining HDR image such that the given set of HDR images excludes the remaining HDR image, and said remaining HDR image serves as a next first HDR image of a next given set of HDR images.

9. A video transport system comprising at least one server that is communicably coupled to at least one of: a client device, a data repository, via a communication interface, wherein the at least one server is configured to:

receive high dynamic range (HDR) video content comprising a plurality of HDR images;
perform HDR mastering for the plurality of HDR images according to HDR mastering parameters;
transform an input colour space of the plurality of HDR images into a transport colour space, wherein for performing said transformation, the at least one server is configured to:
plot colour component values of pixels in a first HDR image amongst a given set of HDR images, across a multi-dimensional colour space, wherein different dimensions of the multi-dimensional colour space represent different colour components;
identify a bounding box corresponding to the first HDR image, wherein the bounding box encloses at least colour component values of two or more colour components represented in the multi-dimensional colour space;
determine a transformation to be applied to the input colour space of the given set of HDR images such that upon applying the transformation, the colour component values enclosed in the bounding box utilise an entire dynamic range of the transport colour space;
apply the transformation to each HDR image in the given set of HDR images, wherein when transforming the input colour space of the plurality of HDR images, the at least one server is further configured to skew the bounding box towards a dimension representing a colour component with a widest range of colour component values amongst the two or more colour components;

wherein the at least one server is further configured to compress the plurality of HDR images having the transport colour space by:
setting sampling resolutions for all colour components in the input colour space such that the colour component with the widest range has a highest sampling resolution amongst the sampling resolutions; and
sampling all the colour components according to their corresponding sampling resolutions, wherein a portion of a number of bits per sample for the colour component with the widest range is re-allocated to one or more other colour components; and
transport the plurality of HDR images having the transport colour space to the at least one of: the client device, the data repository.

10. The video transport system of claim 9, wherein the transformation is one of: a two-dimensional affine linear transformation, a three-dimensional affine linear transformation.

11. The video transport system of claim 9, wherein when determining the transformation to be applied to the input colour space of the given set of HDR images further, the at least one server is configured to at least one of:
translate the colour component values according to the dynamic range of the transport colour space;
rotate the colour component values according to the dynamic range of the transport colour space;
scale the colour component values according to the dynamic range of the transport colour space;
adjust a function that maps the colour component values to the dynamic range of the transport colour space, based on a density pattern of the colour component values, and mapping the colour component values to the dynamic range of the transport colour space using the adjusted function.

12. The video transport system of claim 11, wherein the function is a parametric function which is adjustable for each image according to colour component values of each HDR image, the parametric function being received as a metadata along with the HDR video content.

13. The video transport system of claim 9, wherein the at least one server is further configured to obtain, from the at least one client device, a stream of viewing condition metadata comprising at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the at least one client device is used, display screen capabilities;
wherein when determining the transformation to be applied to the input colour space, the at least one server is configured to perform said transformation to the colour component on a per-frame basis, based on the viewing condition metadata,
and wherein when transporting the plurality of HDR images having the transport colour space, the at least one server is configured to send a stream of the plurality of HDR images having the transport colour space to the at least one client device.

14. The video transport system of claim 9, wherein when transforming the input colour space of the plurality of HDR images into the transport colour space, the at least one server is further configured to adjust a size of the bounding box by at least one of:
increasing the size of the bounding box by a predefined extent, such that the bounding box also encloses additional colour component values surrounding the colour component values of two or more colour components; and
increasing the size of the bounding box such that the bounding box also encloses previous colour component values of pixels in at least one previous HDR image, wherein the at least one previous HDR image is received prior to receiving the first HDR image.

15. The video transport system of claim 9, wherein when transforming the input colour space of the plurality of HDR images into the transport colour space, the at least one server is further configured to define the given set of HDR images to comprise one of:
a single HDR image, wherein the single HDR image is the first HDR image;
two or more HDR images comprising the first HDR image and at least one remaining HDR image, wherein a number of HDR images in the at least one remaining HDR image lies within a predefined range;
two or more HDR images comprising the first HDR image and at least one remaining HDR image, wherein a number of HDR images in the at least one remaining HDR image is dynamically adjusted, wherein the at least one server is configured to perform, for each remaining HDR image:
plot colour component values of pixels in said remaining HDR image, across the multi-dimensional colour space;
identify a test bounding box corresponding to said remaining HDR image, wherein the test bounding box encloses the colour component values of pixels in said remaining HDR image;
determine whether a size of the test bounding box is greater than the bounding box;
when the size of the test bounding box is greater than the bounding box, terminate the given set of HDR images at said remaining HDR image such that the given set of HDR images excludes the remaining HDR image, and said remaining HDR image serves as a next first HDR image of a next given set of HDR images.

16. A video transport method comprising:
receiving high dynamic range (HDR) video content comprising a plurality of HDR images;
performing HDR mastering for the plurality of HDR images according to HDR mastering parameters;
transforming an input colour space of the plurality of HDR images into a transport colour space, by:
plotting colour component values of pixels in a first HDR image amongst a given set of HDR images, across a multi-dimensional colour space, wherein different dimensions of the multi-dimensional colour space represent different colour components;
identifying a bounding box corresponding to the first HDR image, wherein the bounding box encloses at least colour component values of two or more colour components represented in the multi-dimensional colour space;
determining a transformation to be applied to the input colour space of the given set of HDR images such that upon applying the transformation, the colour component values enclosed in the bounding box utilise an entire dynamic range of the transport colour space;

applying the transformation to each HDR image in the given set of HDR images, and
wherein the step of determining the transformation to be applied to the input colour space of the given set of HDR images further comprises at least one of:
translating the colour component values according to the dynamic range of the transport colour space;
rotating the colour component values according to the dynamic range of the transport colour space;
scaling the colour component values according to the dynamic range of the transport colour space;
adjusting a function that maps the colour component values to the dynamic range of the transport colour space, based on a density pattern of the colour component values, and mapping the colour component values to the dynamic range of the transport colour space using the adjusted function, wherein the function is a parametric function which is adjustable for each image according to colour component values of each HDR image, the parametric function being received as a metadata along with the HDR video content; and
transporting the plurality of HDR images having the transport colour space.

17. A video transport method comprising:
receiving high dynamic range (HDR) video content comprising a plurality of HDR images;
performing HDR mastering for the plurality of HDR images according to HDR mastering parameters;
transforming an input colour space of the plurality of HDR images into a transport colour space, by:
plotting colour component values of pixels in a first HDR image amongst a given set of HDR images, across a multi-dimensional colour space, wherein different dimensions of the multi-dimensional colour space represent different colour components;
identifying a bounding box corresponding to the first HDR image, wherein the bounding box encloses at least colour component values of two or more colour components represented in the multi-dimensional colour space;
determining a transformation to be applied to the input colour space of the given set of HDR images such that upon applying the transformation, the colour component values enclosed in the bounding box utilise an entire dynamic range of the transport colour space;
applying the transformation to each HDR image in the given set of HDR images; and
transporting the plurality of HDR images having the transport colour space, wherein the method further comprises obtaining, from at least one client device, a stream of viewing condition metadata comprising at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the at least one client device is used, display screen capabilities;
wherein the step of determining the transformation to be applied to the input colour space is performed on a per-frame basis, based on the viewing condition metadata,
and wherein the step of transporting the plurality of HDR images having the transport colour space comprises sending a stream of the plurality of HDR images having the transport colour space to the at least one client device.

18. A video transport system comprising at least one server that is communicably coupled to at least one of: a client device, a data repository, via a communication interface, wherein the at least one server is configured to:
receive high dynamic range (HDR) video content comprising a plurality of HDR images;
perform HDR mastering for the plurality of HDR images according to HDR mastering parameters;
transform an input colour space of the plurality of HDR images into a transport colour space, wherein for performing said transformation, the at least one server is configured to:
plot colour component values of pixels in a first HDR image amongst a given set of HDR images, across a multi-dimensional colour space, wherein different dimensions of the multi-dimensional colour space represent different colour components;
identify a bounding box corresponding to the first HDR image, wherein the bounding box encloses at least colour component values of two or more colour components represented in the multi-dimensional colour space;
determine a transformation to be applied to the input colour space of the given set of HDR images such that upon applying the transformation, the colour component values enclosed in the bounding box utilise an entire dynamic range of the transport colour space;
apply the transformation to each HDR image in the given set of HDR images; and
transport the plurality of HDR images having the transport colour space to the at least one of: the client device, the data repository, wherein when determining the transformation to be applied to the input colour space of the given set of HDR images further, the at least one server is configured to at least one of:
translate the colour component values according to the dynamic range of the transport colour space;
rotate the colour component values according to the dynamic range of the transport colour space;
scale the colour component values according to the dynamic range of the transport colour space;
adjust a function that maps the colour component values to the dynamic range of the transport colour space, based on a density pattern of the colour component values, and mapping the colour component values to the dynamic range of the transport colour space using the adjusted function, wherein the function is a parametric function which is adjustable for each image according to colour component values of each HDR image, the parametric function being received as a metadata along with the HDR video content.

19. A video transport system comprising at least one server that is communicably coupled to at least one of: a client device, a data repository, via a communication interface, wherein the at least one server is configured to:
receive high dynamic range (HDR) video content comprising a plurality of HDR images;
perform HDR mastering for the plurality of HDR images according to HDR mastering parameters;

transform an input colour space of the plurality of HDR images into a transport colour space, wherein for performing said transformation, the at least one server is configured to:
plot colour component values of pixels in a first HDR image amongst a given set of HDR images, across a multi-dimensional colour space, wherein different dimensions of the multi-dimensional colour space represent different colour components;
identify a bounding box corresponding to the first HDR image, wherein the bounding box encloses at least colour component values of two or more colour components represented in the multi-dimensional colour space;
determine a transformation to be applied to the input colour space of the given set of HDR images such that upon applying the transformation, the colour component values enclosed in the bounding box utilise an entire dynamic range of the transport colour space;
apply the transformation to each HDR image in the given set of HDR images; and
transport the plurality of HDR images having the transport colour space to the at least one of: the client device, the data repository, wherein the at least one server is further configured to obtain, from the at least one client device, a stream of viewing condition metadata comprising at least one of: a gaze point of a user's eyes, a size of pupils of the user's eyes, estimated luminosity ranges receivable by the user's eyes, head-pose tracking data indicative of at least a pose of the user's head, lighting conditions in a real-world environment where the at least one client device is used, display screen capabilities;
wherein when determining the transformation to be applied to the input colour space, the at least one server is configured to perform said transformation to the colour component on a per-frame basis, based on the viewing condition metadata, and
when transporting the plurality of HDR images having the transport colour space, the at least one server is configured to send a stream of the plurality of HDR images having the transport colour space to the at least one client device.

* * * * *